March 27, 1973  S. D. POULSEN, JR  3,723,081

BREAK SEAL

Original Filed May 21, 1970

POWER SUPPLY

3/16 HEATED ZONE

CENTER ZONE COOLED BY FORMING ROD

United States Patent Office 3,723,081
Patented Mar. 27, 1973

3,723,081
BREAK SEAL
Stephen D. Poulsen, Jr., Florham Park, N.J., assignor to Airco, Inc.
Original application May 21, 1970, Ser. No. 39,193. Divided and this application Nov. 26, 1971, Ser. No. 202,701
Int. Cl. C03b 23/00
U.S. Cl. 65—55          5 Claims

ABSTRACT OF THE DISCLOSURE

This invention relates to an improved form of break seal which is especially adapted to be used as a closure for a container or which may otherwise be used to form a hermetic seal in laboratory equipment. In its preferred form the break seal is fabricated from soft or borosilicate glass and takes the form of an external tube joined to an internal test tube having an indentation in its sidewall. The indentation forms a weak point in the sidewall of the test tube and in the event that the seal is to be broken an actuating device is pressed against the indentation causing a rupture in the sidewall of the glass tube.

---

This is a division of copending application Ser. No. 39,193, filed May 21, 1970 for "Break Seal."

Break seals are an important piece of laboratory equipment. They are used by the thousands every working day in chemical laboratories all over the world. The most commonly used break seals are manufactured by companies which supply chemical laboratory equipment. They are considered off-the-shelf items and are manufactured so that the user can adapt the seal or incorporate the seal in other apparatus to meet his needs. Generally the break seals are used as a tool of the glass blower in the laboratory. In a typical application the break seal is positioned in the neck of a container or sample bottle to hermetically seal the same. This type of seal is used in order to prevent the escape of any liquid or gas from the container. Break seals are often designed for remote actuation. If, for example, the container holds a poisonous material, then remote breakage of the seal is desired in order that the operator of the equipment is not in close proximity to the seal when it is broken. Furthermore, remote actuation is often desired in order to prevent contamination of the substance in the container. To accomplish this the break seal is located in apparatus which prevents the atmosphere from contacting the substance. An actuating device is incorporated in the apparatus which breaks the seal when desired.

The break seals which are currently commercially available and which will be described in detail below are highly effective as sealing devices. The most popular form of break seal now commercially available takes the form of a gooseneck positioned within a tube. The gooseneck is especially suited for remote actuation. Although this break seal is effective as a seal per se, it has a number of drawbacks which will become readily apparent when compared with the break seal which is the subject of this disclosure.

The principal object of the present invention is to provide a break seal which is effective to form a hermetic seal and yet is capable of being easily ruptured.

Another object of the invention is to provide a break seal which is formed from standard off-the-shelf laboratory equipment.

A further object of the invention is to provide a break seal which is relatively simple to make and which can be made in fact by anyone in the laboratory with a rudimentary knowledge of glass blowing techniques and readily available equipment.

A still further object of the invention is to provide a break seal which requires less material to manufacture than break seals known heretofore.

Another object of the invention is to provide a break seal which is sounder in a structural sense than currently known break seal designs.

A still further object of the invention is to provide a break seal which requires less forming operations in its manufacture than current break seal designs.

Another object of the invention is to provide a break seal which is readily adapted to being remotely actuated.

The above objects features and advantages of the invention will be apparent to those skilled in the art from a study of the specification hereinafter with reference to the attached drawings.

Figure 1:
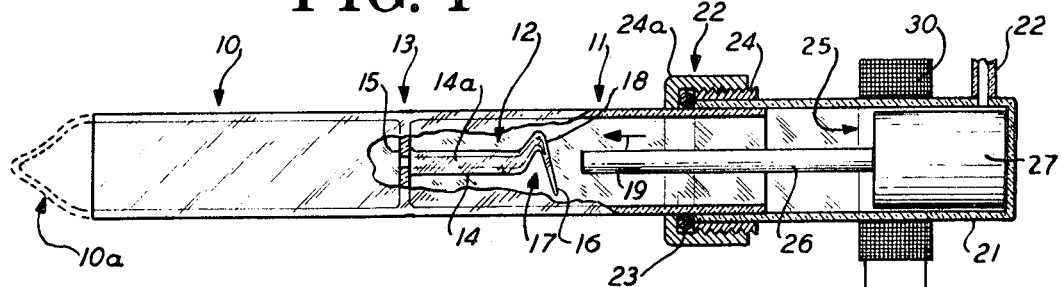
FIG. 1 is a view in elevation, partly broken away, partly in section, of a conventional break seal and actuator.

The conventional break seal which is often described as the gooseneck break seal is formed principally of three components. This seal is illustrated in FIG. 1 and the principal components are tubes 10 and 11, and the gooseneck formation 12. This type of seal is available from a number of suppliers of laboratory equipment. A typical seal is available from Lab. Glass, Inc., Vineland, N.J., as item LG 10690 in their Catalog 66.

In order to manufacture this typical break seal the following steps are taken. Tube 10 is placed in a glass blower's lathe and the end of the tube 13 is flame heated. When the end of the tube becomes soft, it is turned inwardly by means of a tool. The inward flaring of the tube at 13 creates what will be a partition 15 between the tubes 10 and 11. A relatively small diameter tube 14 is joined to the partition 15 so that the interior 14a of tube 14 communicates with the interior of tube 10. When this has been accomplished the tube 14 is heated in the area indicated at 17. When the full circumference of the tube softens, the gooseneck is formed by the glass blower. The gooseneck creates a thinning of the tube wall in the area indicated at 18 and therefore a weak spot in the tube. After the gooseneck is formed the point 16 is fused by the glass blower creating a hermetic seal at the end of tube 14. By creating the sharply angled gooseneck with its thin wall at 18 a break seal which is adapted to quick and easy breakage is achieved. A force applied in the direction of the arrow 19 to the break seal will break the gooseneck and thus the hermetic seal.

In order to complete the fabrication of the conventional gooseneck break seal a further glass tube 11 is placed over the gooseneck and is fused to the tube 10 and the partition 15. This fusion step takes considerable skill in view of the fact that the tubes 10 and 11 must be perfectly aligned and the wall thicknesses of the tubes 10 and 11 must be maintained. Furthermore, the fusion between tubes 10 and 11 and partition 15 must create a further hermetic seal. This last forming step concludes the manufacturing process for conventional gooseneck break seals. The off-the-shelf item which the glass blower then has available constitutes tubes 10, 11 and the internal seal 12. The glass blower then adapts this seal to his equipment. It is to be noted that a total of five manufacturing steps were required to process a single gooseneck break seal.

A typical application of this break seal would be for containing a sample of poisonous gas. Tube 10 would be connected to a sample container by any suitable sealing means or it could be fused to a larger container. The tube 10 could itself be the storage container if the end 10a were fused closed as indicated in dotted lines. If the sample were desired to be transferred from the container then gooseneck seal 12 would be broken by any suitable means. As mentioned above the means of actuation often takes the form of a remote actuator so that the laboratory personnel are not in the immediate vicinity of, or in communication with, the contents of the container. Such an actuator is also illustrated in FIG. 1 and will now be described.

A transfer tube 21 is connected to tube 11 by means of a suitable coupling 22. This coupling includes a threaded portion 24 on or fixed to tube 21, a coupling 24a having a threaded portion which mates with portion 24 and a seal 23 adapted to be forced against tube 11. The seal 23 forms the hermetic seal between the tube 21 and the tube 11. Positioned within the transfer tube 21 is a solenoid plunger 25 having an elongated projection or tip portion 26 and a base portion 27. The plunger is actuated by means of a solenoid 30 which surrounds the transfer tube 21. The solenoid is actuated by means of a switch 31 in a suitable electrical circuit leading from a power supply 32.

When it is desired to break the hermetic seal 12 switch 31 is thrown and the solenoid 30 upon being energized serves to move the solenoid plunger 25 in an axial direction in tube 21. The projection 26 contacts the gooseneck and serves to break off the tip. This creates immediate communication between the tubes 10 and 11 and 21. A transfer tube 22 may be connected to tube 11 to further transfer the contents of tube 10. Fluid flow may then take place between these tubes in the manner desired.

The principal drawbacks of the above-mentioned break seal relate to its complex construction, high cost of manufacture and waste of material.

Figure 2:
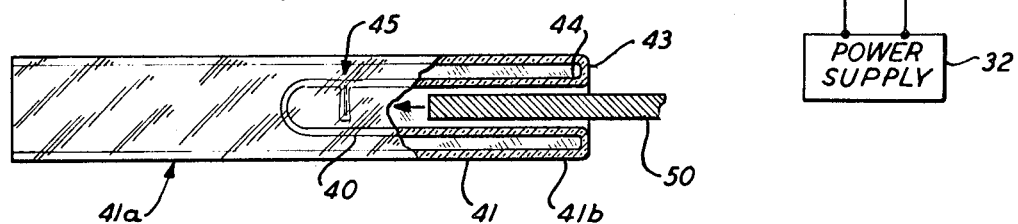
FIG. 2 is a view in elevation, partly broken away, partially in section, of a preferred form of the break seal which is the subject of this application.

In order to avoid these drawbacks and provide a seal which is more effective than those presently on the market, the seal as illustrated in FIG. 2 was devised. The seal is formed from a conventional test tube 40 and a section of larger diameter tubing 41. As mentioned above the seal can be made from standard off-the-shelf items. The glass blower selects a standard test tube of desired diameter and length and flame heats a localized area of the sidewall and forms an indentation 45 from the localized heated area. A more detailed explanation of how this indentation is formed will be given below in connection with a discussion of FIGS. 3A, 3B and 4. For present purposes it is sufficient to say that the indentation 45 is a weak spot in the sidewall of the tube 40. The indentation is formed in such a way that it extends a considerable distance across the interior of the tube 40. The open end 44 of the tube 40 is then fused to the end of tube 41. This may be done by positioning tube 41 in a glass blower's lathe, inserting tube 40 inside tube 41, rotating both tubes at the same speed, and then by means of a flame, fusing the ends together. Care must be taken that tube 41 retains its proper diameter.

The complete seal, therefore, constitutes concentrically arranged cylinders which are fused together as described above. The seal may be used in the same manner as the above described gooseneck seal. The lower part 41a of tube 41 may, therefore, form a part of a container or may be attached to a larger container or other apparatus. The upper part 41b of tube 41 may be positioned within a coupling, such as coupling 22 shown in FIG. 1.

In order to activate this break seal a plunger 50 which is connected to a solenoid device such as disscussed in connection with FIG. 1 is activated to move axially toward the indentation 45 and upon contacting the same causes the indentation to fragment and break the hermetic seal. In order to simplify this illustration, the solenoid structure, transfer tube structure and external sealing, such as discussed in connection with FIG. 1, is not shown in FIG. 2.

Thus it can be readily seen that the break seal illustrated in FIG. 2 is formed from only two relatively simple steps as compared with the five steps necessary to complete the gooseneck seal. The first step involves the forming of the indentation 45 and the second step involves the fusion of the tube 40 to the tube 41. It is also apparent that considerably less material is used in the making of the break seal illustrated in FIG. 2.

Figure 3A:
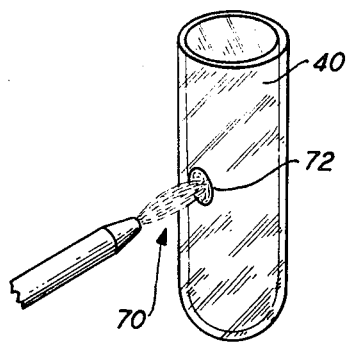
FIGS. 3A and 3B are schematic illustrations of the important steps in forming the break seal illustrated in FIG. 2.
Figure 3B:
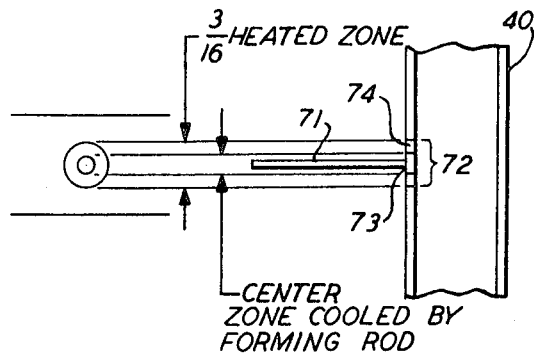
Figure 4:
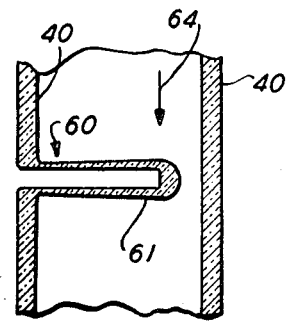
FIG. 4 is a detailed showing of a cross section of a break seal according to this invention.

The technique for forming the indentation 45 is illustrated schematically in FIGS. 3A, 3B and 4. In its preferred form, the indentation takes the form illustrated in FIG. 4; i.e. the wall portion 60 of the indentation, which is closest to the tube wall 40, has the thinnest wall thickness of the indentation. By creating a thin wall at this location it takes less force on the part of the plunger 50 to fracture the break seal due to the fact that the plunger strikes the end of the indentation and causes a relatively large torque, which breaks off the seal adjacent the wall 40. If, on the other hand, the wall thickness at 60 were thicker than that near the end of the indentation 61 more force would be required to fracture the indentation.

The initial forming step for creating the desired wall thickness is illustrated in FIG. 3A. A small diameter flame 70, adjusted to give minimum flame splashing to the area immediately surrounding the area to be softened, is directed at the test tube 40. It has been found that a heated zone approximately $3/16$ inch in diameter is sufficient to cause the desired soft spot. When the glass is heated to the desired temperature, as indicated by the glass just beginning to soften, a forming rod 71 (see FIG. 3B), which is made of tungsten and which has been dipped in graphite in a colloidal suspension, is pressed against the heated zone 72 and forced inwardly a substantial distance into the interior of the tube 40. Preferably the rod is at ambient temperature. It has been found that the tip of the forming rod 71 acts as a heat sink and partially cools the center 73 of the hot spot 72. This cooling of the center spot, which occurs simultaneously with the inward thrust of the rod 71, serves to prevent excessive thinning of the center spot and thus substantial thinning of the indentation occurs only in the areas of the sidewall 60 of the indentation. This is illustrated in FIG. 4. As mentioned above, this results in the weakest area of the indentation being in the most desired position; i.e. immediately adjacent the tube 40.

The graphite coating on the forming rod prevents the rod and the hot spot from fusing together and sticking. By using a forming rod of uniform cross section an indentation with substantially uniform internal diameter is achieved. This is preferred in that this assists the thinning of the indentation at the desired area. Thus if a conically shaped forming rod were used it would probably serve to cause excessive and undesired wall thickness at the portion adjacent the tube 40.

Referring to FIG. 3B, note that the center spot 73 of the indentation is surrounded by a ring of softened glass 74. It is this softened ring 74 which creates the thin wall 60, while leaving a heavier wall thickness at the end 61. When a downward force 64 is exerted on portion 61 it puts the upper part of thin wall 60 under tension and easily breaks it. It is well known that glass is much stronger in compression than in tension. It has been established that new glass will probably break if tensile stress of about 240 kg./cm.$^2$ is applied to it. However, the same glass in compression requires about 2400 kg./cm.$^2$ before it fails. Thus by putting the thin wall under tension I take advantage of an inherent structural weakness in the glass itself and thereby facilitate the breaking.

It is apparent that the steps discussed above in connection with FIGS. 3A, 3B and 4 are quite simple and may be performed by laboratory technicians, etc. who have only a rudimentary knowledge of glass blowing techniques. A glass seal according to the instant disclosure may be manufactured from standard equipment such as test tubes and tubing found in the laboratory.

As shown in FIGS. 2 and 4, the indentation is preferably directed radially inwardly. It is, however, also possible to direct the indentation at an angle to a radius drawn from the base of the hot spot. Such a configuration, however, would tend to make the wall thickness of the indentation non-uniform. The length of the indentation should be such as to position the inner end 61 in the path of the plunger or actuator.

While a relatively complicated actuator may be used, such as shown in FIG. 1, any suitable form of actuator, whether it be manually operated or otherwise, may also be used. Quite often a nail is positioned in the tube containing the break seal, and then a magnet is used to raise the nail and when the nail is released gravity causes the nail to drop and break the seal.

The above described break seal may be fabricated from suitable soft glass, such as soda-lime or lead, or from borosilicate glass or silica glass. It all depends on the intended use of the break seal. Furthermore, it is also possible to employ other materials, such as suitable plastic materials, in making the break seal.

It will be understood by those skilled in the art that the present invention is not limited to the specific form or structures described herein by way of illustration but that the scope of the invention is defined in the appended claims.

I claim:

1. A method of fabricating a break seal comprising in sequence the steps of: heating a localized area of the sidewall of a test tube by directing a small diameter flame upon said area until a circular softened glass zone is formed; coating the tip portion of a tungsten forming rod of substantially uniform cross-section with graphite to prevent sticking to said softened glass and pressing said coated tip of said forming rod against the softened zone in an inward direction so that the softened glass is stretched over the rod as it moves inwardly and so that an imperforate indentation extending a substantial distance into said tube is formed in said sidewall; removing said rod from said indentation so that the indentation remains as an integral part of said sidewall, and further positioning said test tube within a container and fusing the open end of said test tube to said container.

2. The method of claim 1 wherein said container is a larger diameter tube than said test tube, and said test tube is positioned concentrically within said larger diameter tube.

3. The method of claim 2 in which said fusing is accomplished by rotating said larger diameter tube about its axis, coaxially positioning the test tube in said larger tube and rotating said test tube at the same speed and heating the open end of the test tube and the adjacent portion of the larger tube, and fusing the same together to form a hermetic seal.

4. The method of claim 1 further comprising maintaining said forming rod at substantially ambient temperature prior to using the rod to press the indentation, the tip of said forming rod which first contacts the relatively hot softened glass zone acting as a heat sink to lower the temperature of said area contacted and thereby lessen the thinning of the area contacted as the softened glass is pressed inwardly.

5. The method of claim 1 further comprising pressing said area contacted inward with the tip of the rod to the extent necessary to stretch the soft spot over the rod and create an indentation having a wall portion of less thickness than the thickness of the area contacted by the rod tip.

References Cited

UNITED STATES PATENTS

| | | | |
|---|---|---|---|
| 2,000,560 | 5/1935 | Eitel et al. | 65—55 |
| 3,369,883 | 2/1968 | Smith | 65—112 |
| 2,588,306 | 3/1952 | Taylor | 65—59 |

S. LEON BASHORE, Primary Examiner

K. M. SCHOR, Assistant Examiner

U.S. Cl. X.R.

65—120